June 20, 1961  W. G. LUNDQUIST  2,989,022
INTERNAL COMBUSTION ENGINE
Filed May 14, 1959  7 Sheets-Sheet 1

INVENTOR.
WILTON G. LUNDQUIST.
BY
ATTORNEYS.

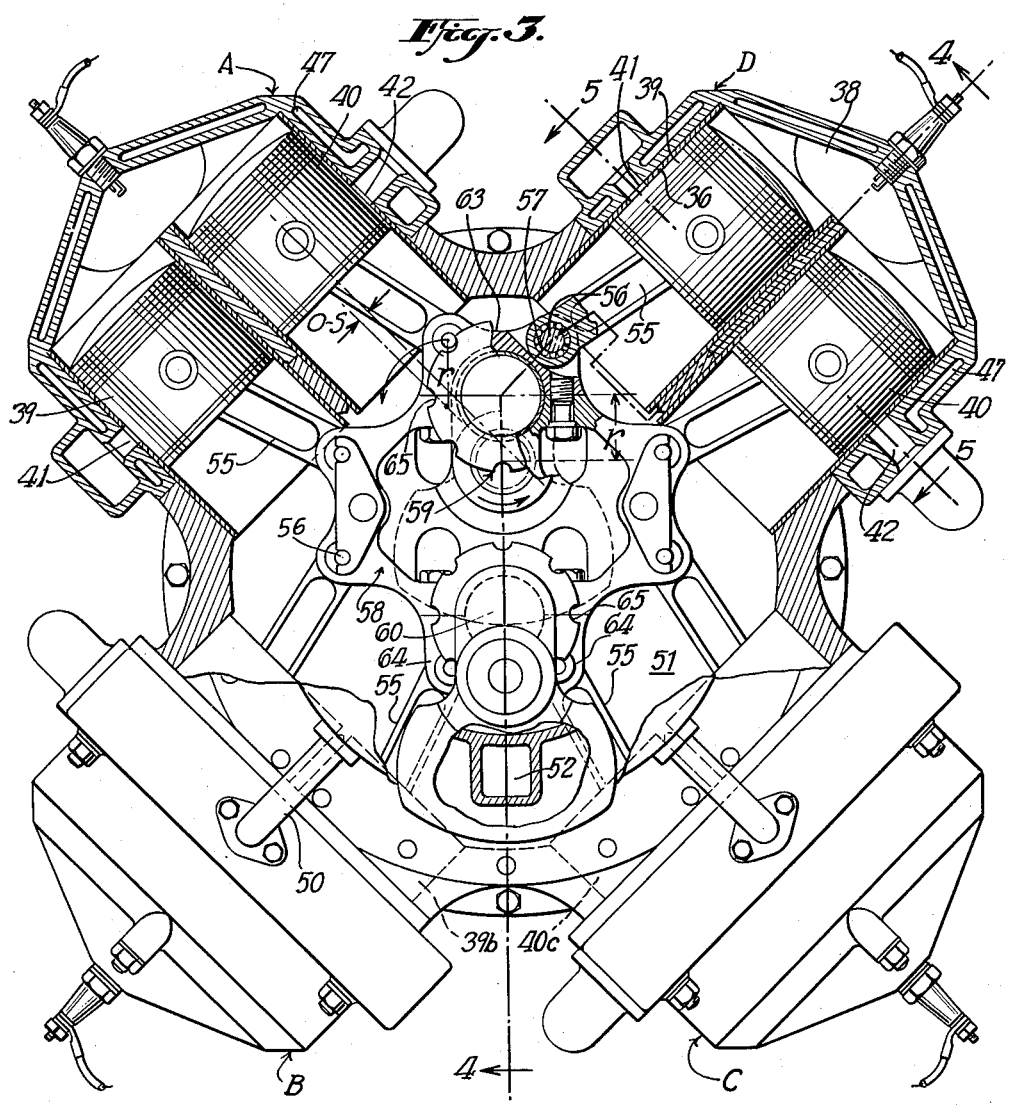

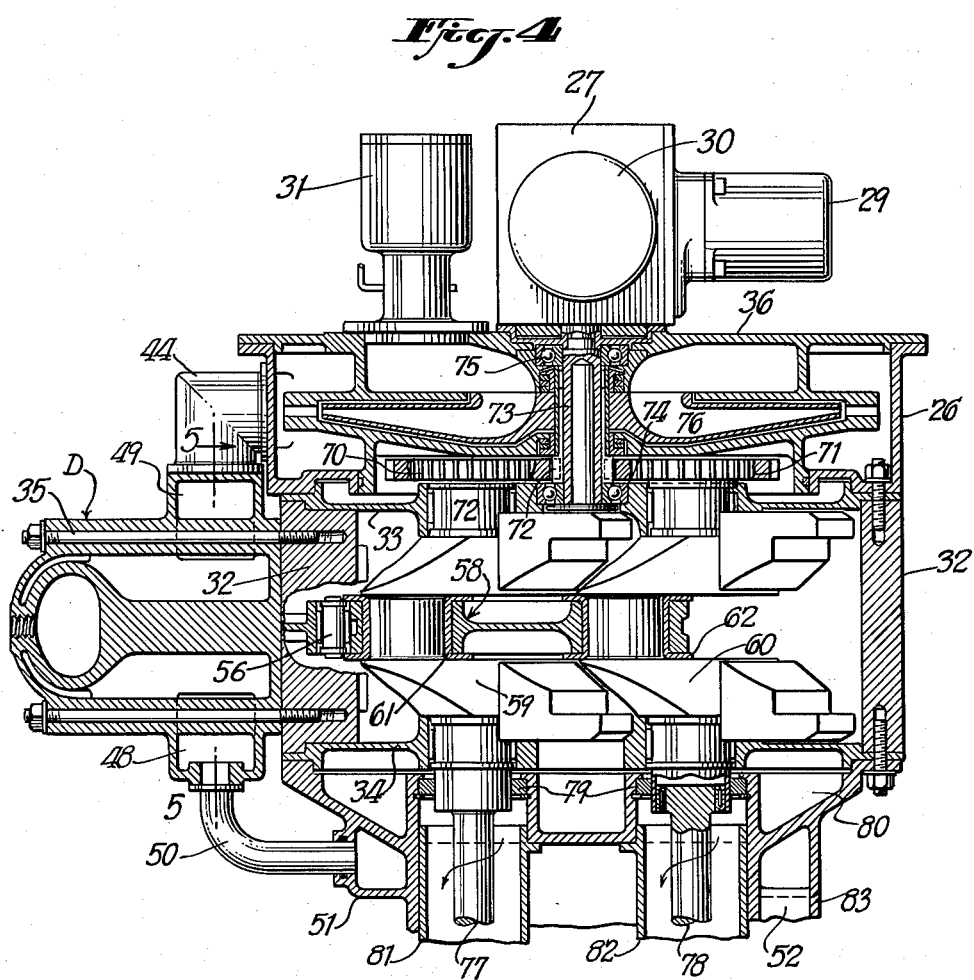
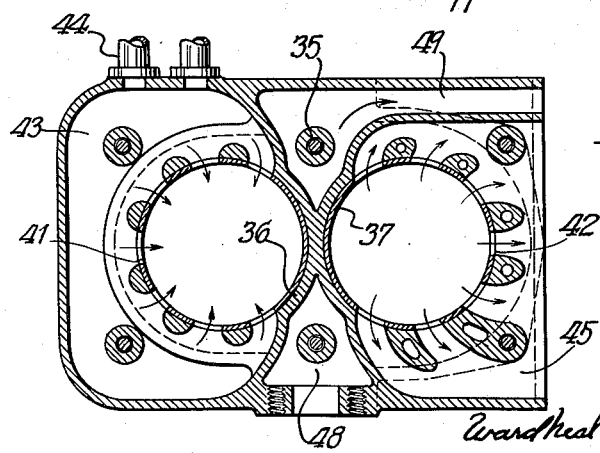

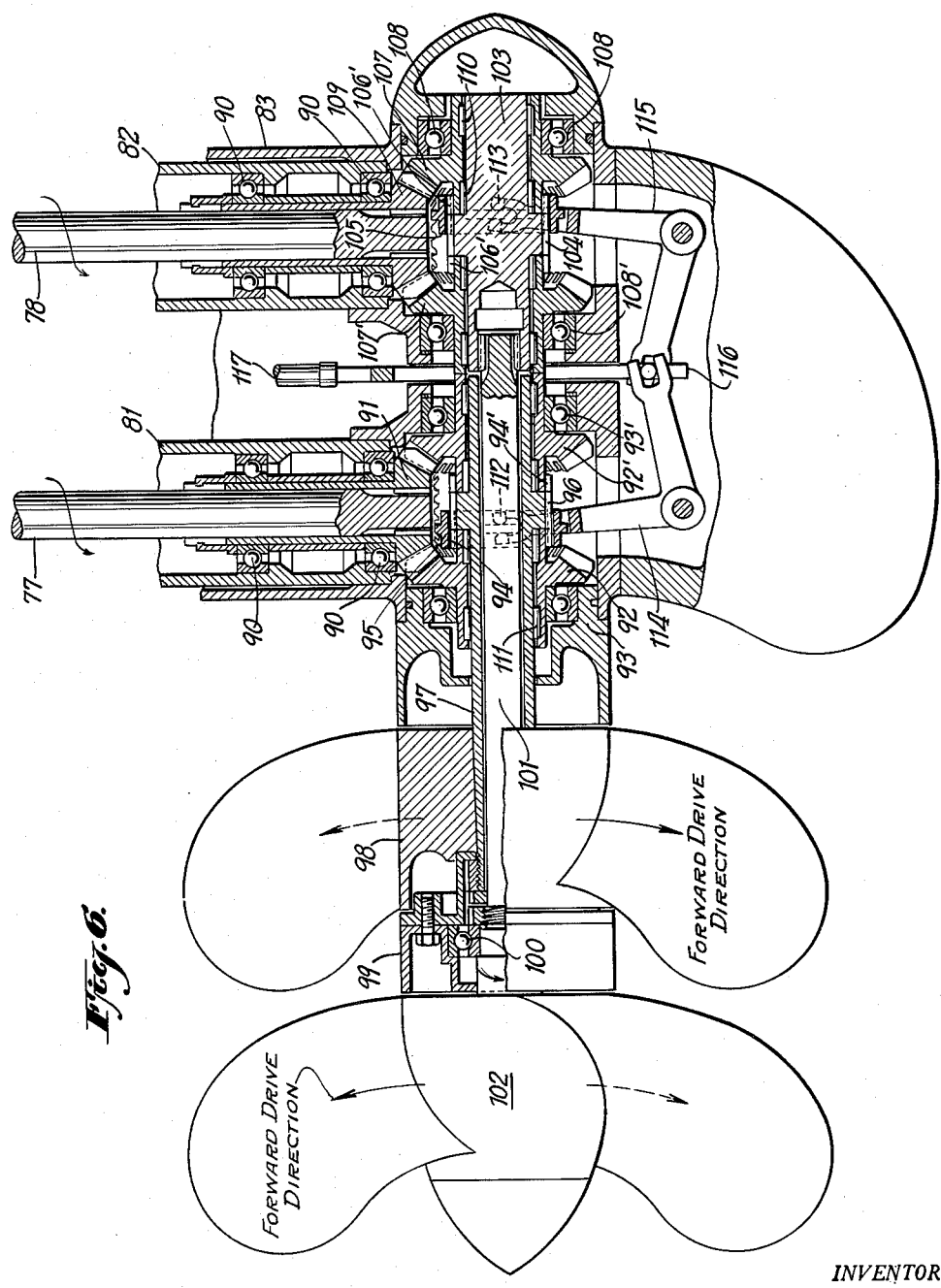

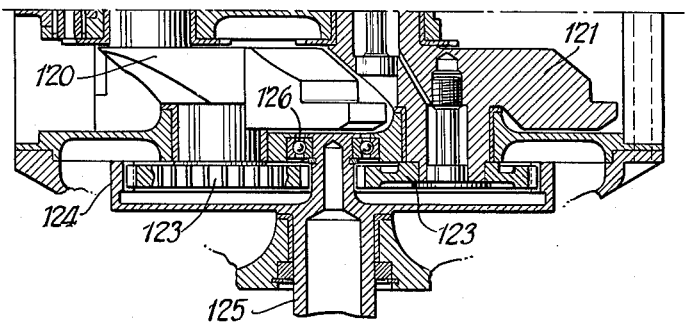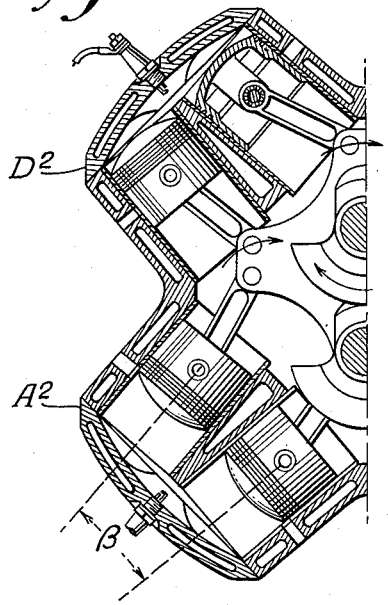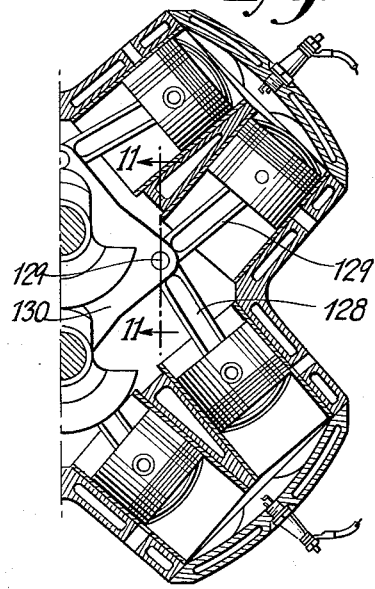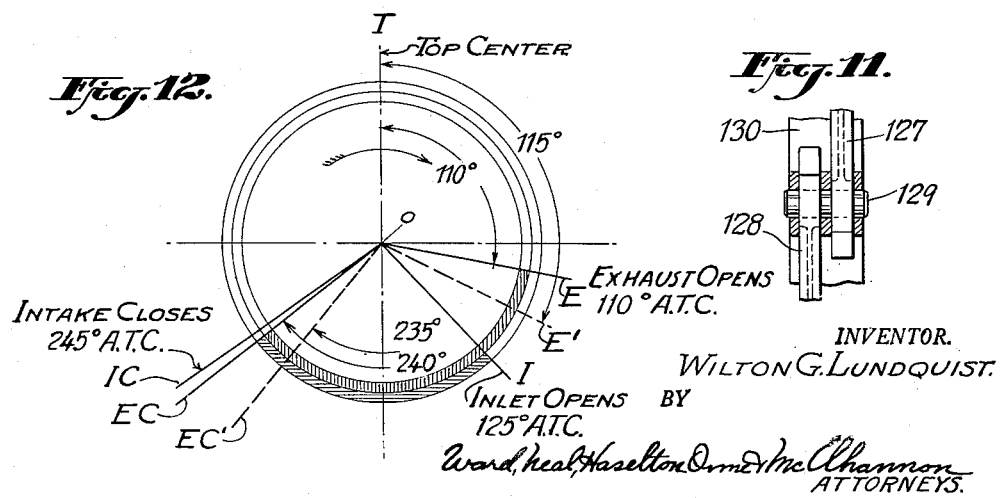

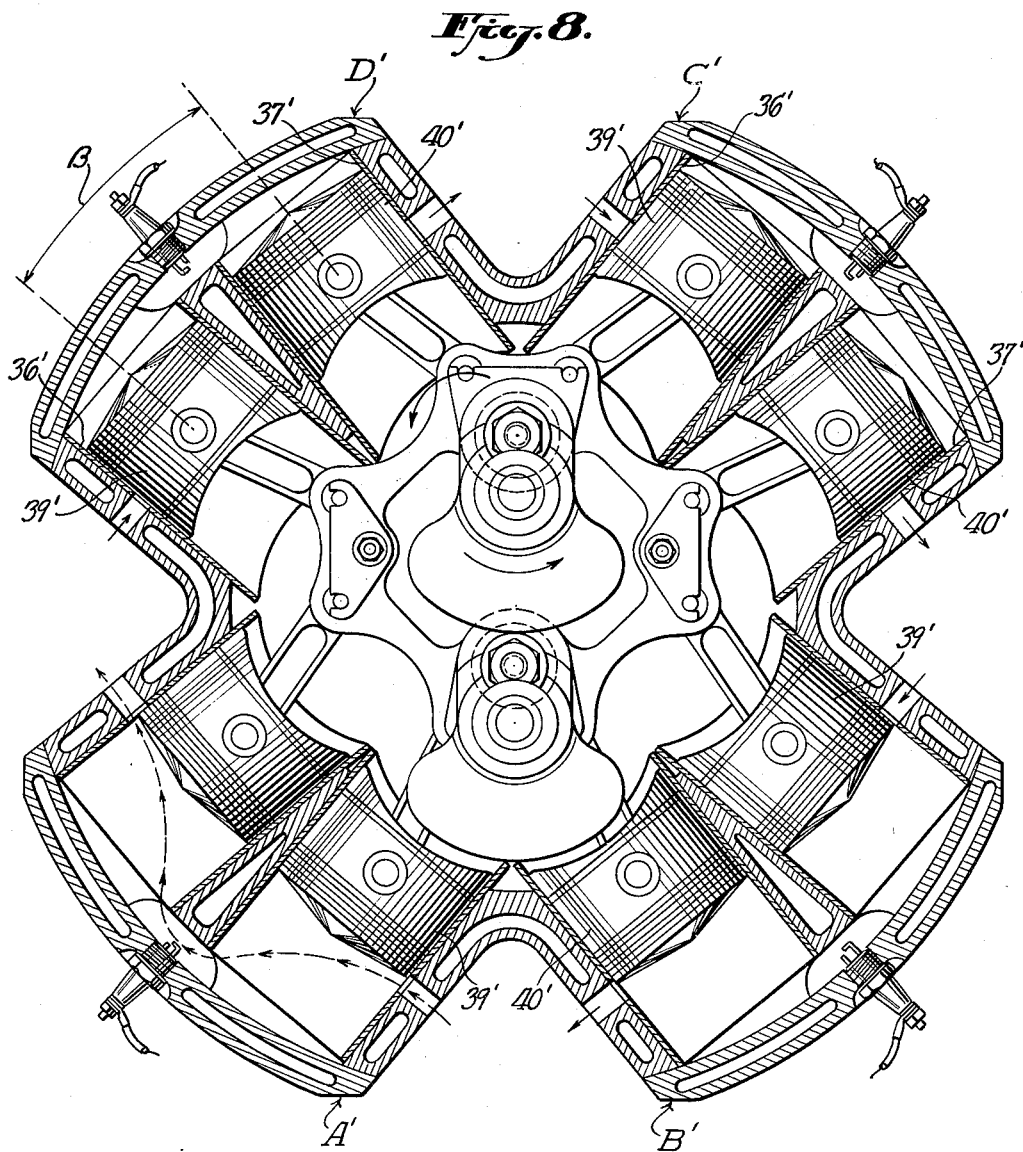

INVENTOR.
WILTON G. LUNDQUIST.

United States Patent Office 2,989,022
Patented June 20, 1961

2,989,022
INTERNAL COMBUSTION ENGINE
Wilton G. Lundquist, 32 Hollis Drive, Hohokus, N.J.
Filed May 14, 1959, Ser. No. 813,111
16 Claims. (Cl. 115—37)

This invention relates to internal combustion piston engines and more particularly to two stroke cycle engines employing a U-type cylinder arrangement. The invention may be usefully employed in both the Otto cycle and diesel cycle engines.

The general parameters governing successful engine development are cost, performance, size and weight. Depending upon the particular application, some combination of these parameters becomes controlling from the standpoint of saleability. The development of the internal combustion piston engine has been a continuous struggle to achieve optimum combinations of these factors. Most of this development effort in the past has been applied to the four stroke cycle engine, and we see all about us the results of this effort.

By comparison, the development of the two stroke cycle engine has lagged, except in its application to large, slow speed diesels, and to certain small industrial, marine, and automotive engines. The basic simplicity of the two stroke engine has, however, intrigued engineers because of the great potential for lower cost and better durability which this implies, and consequently many competent investigators have continued their development efforts.

Interest in the intermediate speed and high speed two cycle engine increased during and after World War II and notable progress resulted both in Europe and in the U.S.A.—particularly in the diesel engine field. As a result several marketable engines evolved such as the General Motors "71" series, the Krupp truck diesels, the Deutz two cycle diesels, the Krauss Maffei engines, the Graff & Stift engines, and others. This progress has justified the confidence of the proponents of the two cycle engine, and development interest is increasing. It can be predicted that, in the near future, a large or perhaps even the largest portion of piston engine development will be in the two cycle field.

An interesting aspect of the recent two cycle development period is that the competent technical fraternity has more or less divided itself into two competing camps on the question of "uniflow" scavenging versus "loop" scavenging. This state of affairs has come about thanks to developments, principally in Germany and Austria, which have made the loop scavenged engine a strong contender in the intermediate and high speed diesel engine field otherwise and formerly held by four cycle engines or by uniflow two cycle engines.

This technical controversy points up the fundamental two cycle development problem, i.e., how can good performance be achieved without sacrificing essential two cycle simplicity? Uniflow engines have good performance but current producers have of necessity sacrificed a considerable amount of simplicity in order to employ the uniflow principle. Some use poppet exhaust valve, e.g., General Motors, Krupp, and others. The opposed piston engine types produced by others require multiple in-line crankshafts with connecting gear trains, e.g., Fairbanks Morse, Napier, etc. The Napier "Deltic" engine is a good example of the complication encountered.

The loop scavenged engine is basically simple, but in this type the designer has to contend with the limitations imposed by the symmetrical valve event timing which is inherent in this configuration. To overcome this limitation (necessary if high supercharge is desired) auxiliary valving means are required, and then the basic simplicity is lost. There is also probably some doubt remaining concerning other performance limitations of this engine type.

Obviously what is needed is an engine which combines the performance potential and the unsymmetrical valve timing of the uniflow type with the simplicity of the basic loop scavenged engine. This can be achieved in accordance with my invention by the application of the uniflow scavenged U-type cylinder arrangement. The U-type cylinder engine has interested many investigators, but to date no practical engine configuration has been achieved. All such designs in the past have involved questionable mechanical arrangements. It is an object of this invention to break this barrier and open up a new area of two cycle engine development and progress.

The preceding discussion has dealt largely with diesel engines. The Otto cycle two stroke engine has similarly suffered from slow development progress. In spite of this it has had extensive use in small, low horsepower, industrial, marine, and automotive applications. The outboard marine field is one of these areas, and this field has grown tremendously in the last few years. Here the emphasis has been on light weight and cost, and the engines are the simplest form of two cycle configuration. In this case performance has been sacrificed for the sake of simplicity and as a result the fuel economy is poor. These engines are now up to seventy horsepower in some models and higher power models are desired and would be practical if more favorable weight and size factors were present and better fuel economy could be achieved without costly engine complications. Because of its simple, compact configuration, low weight per H.P. and its potential for good performance, this invention provides an ideal solution to this problem, both as to the Otto cycle two stroke engine and the diesel types.

The U-type cylinder arrangement of this invention consists of two piston ported cylinders joined by a common combustion chamber with suitably out of phase pistons operating in the two cylinders to provide exhaust port timing in one cylinder such that highly efficient uniflow scavenging and charging is obtained. The resulting intake and exhaust port timing sequence is called "unsymmetrical valve timing" because these events do not occur symmetrically in relation to effective top center crank angle. The advantages of the unsymmetrical valve timing is well known; but has never been achieved in the manner provided by this invention.

In the past, only auxiliary valved two cycle engines, or opposed piston, piston ported engines have attained wide application because past attempts to use the U-cylinder arrangement have usually resulted in mechanical compromises of one sort or another which have impaired the simplicity sought for in using the two cycle principle. This invention overcomes this problem by providing an arrangement which takes full advantage of the U-type principle without any mechanical compromises.

A preferred form of U-type engine would be to have all the cylinders of several U-pairs arranged in general alignment in one plane in a radial configuration about a central axis of symmetry. This arrangement has not been achieved to date because no satisfactory mechanical arrangement has been devised to accommodate this desirable arrangement of U-type cylinders. This invention provides the mechanism to accomplish this objective.

Another object of this invention is to provide means for adjusting the crank and connecting rod system of the engine to compensate for manufacturing inaccuracies.

Another object of this invention is to provide a unique marine engine of the nominally outboard type made possible by the particular configuration of the engine according to this invention.

The invention is adapted to a wide range of structural variations and uses. For illustrative purposes a present embodiment of the invention is shown in the form of a marine outboard engine, to which use the engine is ideally suited.

The unique features of this invention provide the following general advantages:

(1) Selection of any desirable exhaust and intake port timing for uniflow scavenging and charging.

(2) Nominally perfect dynamic balance of moving parts by simple counterweighting of the crankshafts for configurations employing four or more cylinder pairs symmetrically arranged about a common center.

(3) Optimum design simplicity.

(4) Optional use of more than two crankshafts if desired, e.g., three crankshafts for six cylinder pairs, etc.

(5) Compact, low volume, low weight design.

Further specific features and advantages of the invention will be hereinafter more fully set forth with reference to the annexed drawings, showing a presently preferred embodiment of the invention and certain modifications thereof, in which.

Figure 1:
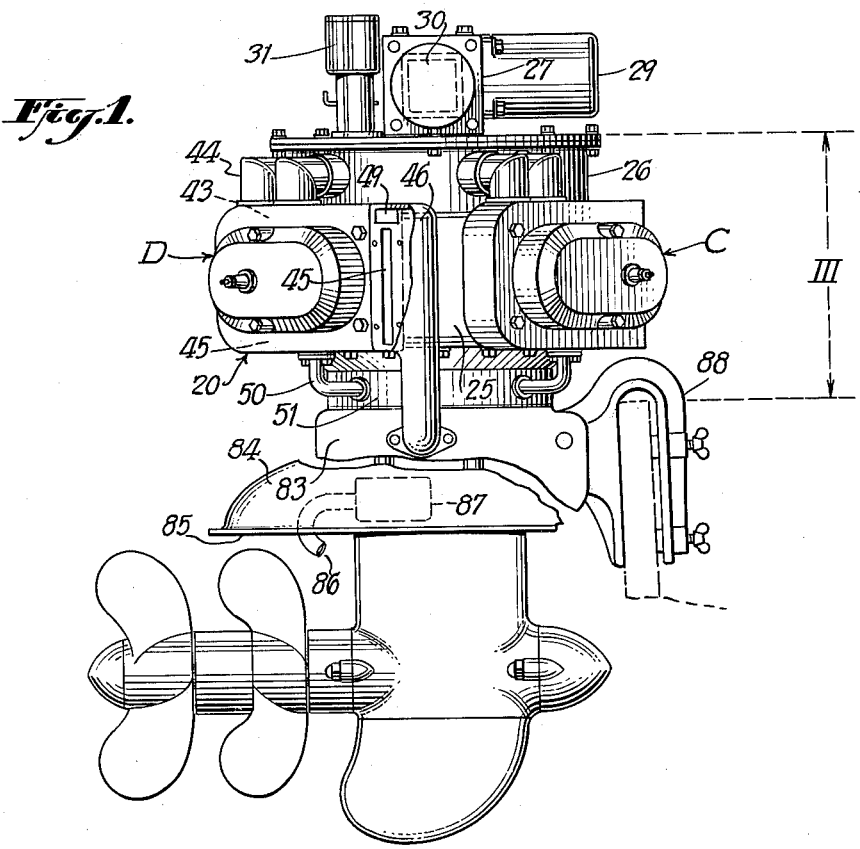
FIG. 1 is a side elevational view of an embodiment of the present invention adapted for use as a marine outboard engine.
Figure 2:
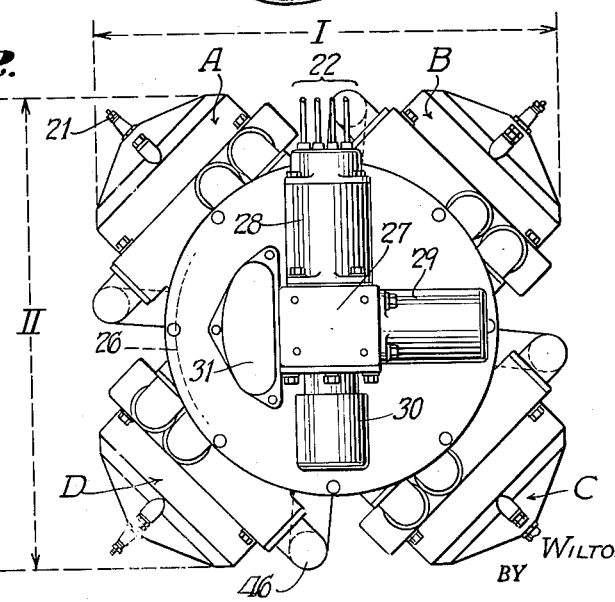
FIG. 2 is a top plan view of the engine shown in FIG. 1.
Figure 13:
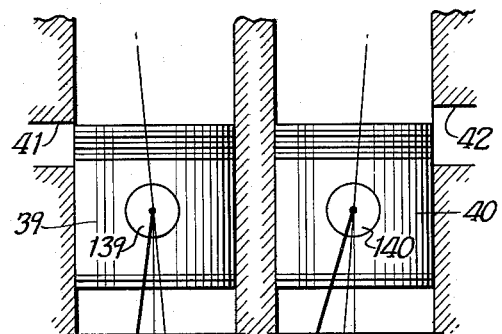
Figure 14:
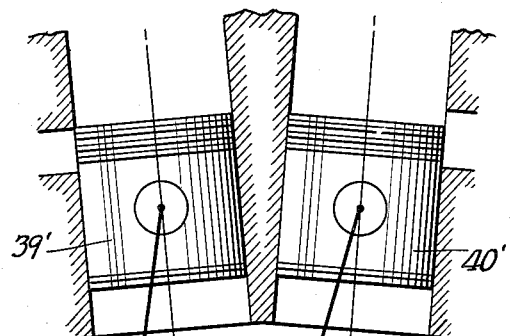

FIG. 3 is a bottom plan view of the engine shown in FIGS. 1 and 2, with certain parts shown in section and with the engine rotated about its vertical axis 90° in a clockwise direction relative to the position of the engine as shown in FIGS. 1 and 2;

FIG. 4 is a longitudinal sectional view taken on line 4—4 of FIG. 3;

FIG. 5 is a cross-sectional view taken on line 5—5 of FIG. 4;

FIG. 6 is a somewhat enlarged side elevational view, partly in section, of the propeller end of the engine shown in FIG. 1, illustrating further details of the drive gearing mechanism;

FIG. 7 is a fragmentary longitudinal sectional view showing a modification of the engine shown in FIG. 4 to illustrate the use of a single power output shaft instead of the two shafts shown in FIG. 4;

FIG. 8 is a cross-sectional view, somewhat similar to FIG. 3, showing a modification in which the cylinder bores in each common U-type cylinder are arranged at an outwardly diverging angle;

FIG. 9 is a fragmentary side elevational view similar to FIG. 8 showing a further modification in which a pair of cylinders at each U-shape cylinder is arranged at an outwardly converging angle;

FIG. 10 is a cross-sectional view similar to FIG. 9 showing a modification of the engine shown in FIG. 9 with respect to the connecting rod arrangement;

FIG. 11 is a sectional view taken on line 11—11 of FIG. 10;

FIG. 12 is a timing diagram for the exhaust and inlet ports;

FIG. 13 is a diagrammatical view illustrating the out of phase angle with respect to the embodiment shown in FIG. 3; and FIG. 14 is a similar view with respect to the embodiment shown in FIG. 8.

Referring more particularly to FIGS. 1 and 2 of the drawing: The engine in its entirety is designated 20 and in the present embodiment comprises four cylinder block units A, B, C and D mounted on a crankcase designated generally as 25. It is to be understood, of course, that the invention may be embodied in engines having a different number of cylinders, preferably an even number, such as 6, 8, etc. In the present adaptation of the engine for use as a marine outboard engine it will be positioned in use as illustrated in FIG. 1. A supercharger housing 26 is mounted on the top end of the crankcase 25 and on top of that is mounted a gear box 27 on which are supported auxiliary units such as a generator 28, a starter 29 and a fuel pump 30 to be driven by suitable gearing within the gear box. A carburetor 31 is also mounted on the supercharger housing 26. Preferably the crankcase 25 is provided with a body portion 32 (FIG. 4) and identical end portions 33 and 34. The cylinder block units such as C are secured to the body portion 32 by suitable means such as the stud bolts 35. Each cylinder block unit is in the form of a U-type cylinder comprising a pair of cylinder bores such as 36 and 37 (FIGS. 3 and 5) interconnected by a common combustion chamber such as 38.

Each cylinder bore such as 36 is provided with intake valve ports such as 41 controlled by the piston 39 and each cylinder bore such as 37 is provided with exhaust ports such as 42 controlled by the piston such as 40. For purposes of convenience, hereafter in distinguishing between the corresponding parts associated with the individual cylinder units such as A, B, C and D, the corresponding parts will be identified with particular cylinder block units by adding a suffix cylinder block reference letter to the part number, e.g., 39c, etc. The intake ports 41 are in communication with a common intake passage 43 which is interconnected by means of elbows 44 with the interior of the supercharger casing 26 (FIG. 4) and the exhaust ports such as 42 are in communication with a common passage 45 (FIG. 5) which is in communication with an exhaust pipe 46. Each cylinder block unit is likewise provided with the usual water passages such as 47 for cooling purposes and these are supplied with cooling fluid through a water intake passage 48 and a water outlet passage 49 (FIG. 5) which empties into exhaust pipe 46. The water intake passages 48 are supplied with cooling water through pipes such as 50 (FIGS. 1 and 3) which connect the same with a common water manifold 51 which in turn is in communication through a passage 52 (FIG. 3) with a source of cooling water to be referred to hereinafter.

It will be seen from FIGS. 3, 4 and 5 that the U-type cylinder units A, B, C and D extend radially outwardly from and are disposed symmetrically about a common axis which corresponds with the longitudinal axis of the motor; the cylinders being positioned in circumferential alignment with the center lines of the cylinder bores preferably lying in a plane at right angles to the said axis of symmetry. It is highly desirable that the cylinder bores are thus disposed to obtain optimum conditions; however, as will be more particularly pointed out hereinafter, the cylinder bores in each cylinder may be offset a small amount while still fulfilling the advantages of the invention.

The pistons 39 and 40 of each pair of cylinder bores are connected to a true motion frame 58 by individual connecting rods such as 55. The true motion frame rides on the crankpins of two single throw crankshafts 59 and 60. The frame links the crankshafts together so that they rotate in phase, and any point on the frame describes a true circle whose radius is equal to the crank throw. The inboard ends of the connecting rods are connected to the frame by knuckle pins such as 56. Each knuckle pin, being journaled, as by means of needle pins 57, in the frame 58, travels in a true circle thereby imparting essentially identical motion to all the pistons if all of the connecting rods were the same length, and if the motion center of each knuckle pin were on the centerline of its own cylinder bore. The true motion frame 58 is journaled on the crank throws of the pair of crankshafts 59 and 60, preferably by means of flanged floating bushings such as 61 and 62 bored slightly eccentric relative to their outside diameter. The bushings 61 and 62 float in the true motion frame 58 but are held from rotation in their respective frame bores by properly spaced notches such as 65 in the flanges which bear against small cylindrical extensions on the ends of the knuckle pins 56. When the engine is assembled, these flanged bearing bushings are rotationally (each about its own center line) oriented so that the center distance between the eccentric bores corresponds closely to the center distance of the two crankshaft main journal center lines. This corrects for manufacturing inaccuracies in frame and crankcase bearing center line spacing. The floating bushings provide some additional compensation plus some cushioning effect because of the multiple oil films involved. This will further compensate for slight difference in crank throw dimensions of the two crankshafts. If desired, additional compensation for difference in actual crank throw dimensions of the two crankshafts can be provided by providing some additional degree of elasticity into the frame as by cutting out the center of the frame 58. The crankshafts 59 and 60 have their crankpin ends journaled on the crankcase ends 33 and 34 (FIG. 4). Preferably the crank throw and crankpin journals are supplied with anti-friction bearings such as needle bearings. In the present embodiment the crankshafts are of one piece construction and therefore split bearings comprising caps such as 63 and 64 are provided for purposes of assembly.

It will be noted that the connecting rods 55 connected to the piston 40a and the piston 39d are pivotally attached to the true emotion frame 58 through the intermediary of the cap member 63 and the connecting rods connected to the pistons 39b and 40c are similarly attached to the true motion frame 58 through the cap member 64. The remaining connecting rods are pivotally attached directly to the body of the true motion frame.

In this embodiment the cylinder bores 36 and 37 of each U-type cylinder are parallel and the desired sequence of value timing events is achieved by offsetting the centers of rotation of the several knuckle pins by a distance O—S from their respective cylinder bore center lines, plus a proper selection of intake and exhaust port heights, i.e., the relative opening position of the top of the exhaust port with respect to the top of the intake port. This provides a very flexible means of providing any predetermined exhaust opening lead, as measured in crank angle degrees, and further provides for the exhaust port closing by any desired predetermined crank angle relative to said inlet ports. For example, the offset distance O—S may be the same or different with respect to each pair of cylinder bores in each U-cylinder, and likewise may be toward each other or away from each other or one toward and one away each from the other. Similarly, variations in the height and spacing of the intake and exhaust ports augment the flexibility.

SUPERCHARGER

Referring to FIG. 4: It will be seen that the upper journal of the crankshaft 59 extends beyond the crankcase end 33 and carries secured thereto a gear 70 and a corresponding gear 71 is similarly secured to the crankshaft 60. These gears are in driving engagement with a pinion gear 72 secured on a shaft 73 journaled in suitable bearings 74 and 75 and carrying fixed thereto a supercharger impeller 76 in operative position within the impeller casing 26. The intake side of the impeller casing is in communication with the carburetor 31 or other suitable air and fuel intake means. Therefore, upon rotation of the impeller, the fuel is forced outwardly through the intake pipes such as 44 and into intake passages of the various cylinders of the engine.

The shaft 73 extends upwardly exteriorly of the casing 26 and drives suitable gearing in the gear box 27 to thereby operate the auxiliary equipment.

The outstanding advantages of engines embodying my invention will be obvious from the following table setting forth characteristics of examples of Otto cycle and diesel cycle engines having four U-type cylinders:

[For dimensions I, II and III, see Figs. 1 and 2]

*Design relations in terms of cylinder bore—"D" (in in.)*

| Otto Cycle Engine (X) | Diesel Cycle Engine (Y) |
|---|---|
| Dimension I=6.17 "D". | Dimension I=7.25 "D". |
| Dimension II=6.17 "D". | Dimension II=7.25 "D". |
| Dimension III=3.83 "D". | Dimension III=3.83 "D". |
| Vol.—Cu. Ft.=I·II·III=.084D³. | Vol.—Cu. Ft.=I·II·III=.116D³. |

| Applications | Engine "X" | Engine "Y" |
|---|---|---|
| Cylinder Bore "D," In | 3 | 6 |
| Dimension I, In | 18.5 | 43.5 |
| Dimension II, In | 18.5 | 43.5 |
| Dimension III, In | 11.5 | 23 |
| Volume, Cu. Ft | 2.27 | 25.2 |
| Piston Area, Sq. In | 57 | 226 |
| Displacement, Cu. In | 140 | 1,357 |
| Power Range, B.H.P | 100–200 | 450–900 |

It will, of course, be understood that in diesel cycle engines embodying my invention, the spark plugs shown in connection with the above described Otto cycle engine will be omitted and in place thereof suitable fuel injection nozzles will be utilized. Fuel will be fed from suitable diesel injection pumps and the supercharger will be utilized to supply air only, instead of the air and fuel mixture as utilized in the Otto cycle engine.

PROPELLER DRIVE

The lower main journals of the crankshafts 59 and 60 (FIG. 4) are suitably connected to a pair of propeller shafts 77 and 78 which are rotated in the same direction of rotation, as indicated by the arrows. Suitable sealing rings such as 79 are provided to prevent leakage of oil which is supplied to the engine under pressure by suitable means (not shown) and passes into an oil sump 80 from whence it is recirculated. The propeller shafts 77 and 78 extend downwardly within shaft housings 81 and 82 secured in position to the upper end of a common outer housing 83 whose upper end is secured to the crankcase and within which upper end is provided the oil sump 80, the water manifold 51 and intake 52. This outer casing is also provided adjacent its upper end with a rearwardly extending portion 84 (FIG. 1), the bottom face of which provides a cavitation plate such as 85 through which a water intake pipe 86 passes and is in communication with a suitable water pump 87 disposed within one of the shaft housings such as 81 and is driven by one of the propeller shafts such as 77. The various exhaust pipes such as 46 pass downwardly from the cylinder block units and are in communication with the interior of the outer casing 83 which is provided with suitable openings (not shown) through which the exhaust may pass outwardly below the water level. Clamping means such as 88 is suitably attached to the forward edge of the outer casing 83 for securing the outboard engine to a boat transom. Further details of the propeller drive will be referred to below.

Referring more particularly to FIG. 6: The shaft housings 81 and 82 are suitably anchored at their lower ends in the common outer housing 83 and carry ball bearings such as 90 within which the shafts 77 and 78 are journaled adjacent their lower ends. The lower end of the shaft 77 carries secured thereto a driving gear 91 which is in driving mesh with a cooperating bevel gear 92 having a rearwardly extending hub end journaled in a ball bearing 93 rigidly secured in the housing 83. The gear 92 is further provided with a forwardly extending hub portion having external splines 94 engageable by cooperating splines carried on the interior of a clutch sleeve 95 slidable axially with respect to and in constant driving engagement with external splines 96 carried on a hollow propeller shaft 97. The clutch sleeve 95 is alternately engageable with external spline teeth 94′ carried on the exterior of a hub portion of a bevel gear 92' also in driving mesh with bevel gear 91; the gear 92' being suitably journaled in a ball bearing 93' rigidly secured in the housing 83. The rearwardly extending end of the propeller shaft 97 carries suitably secured thereto a propeller 98 which in the present embodiment is adapted to exert a forward drive thrust when rotated in a counterclockwise direction as viewed from the front. The shaft 97 projects rearwardly beyond the propeller 98 and carries rigidly secured thereto a bearing housing 99 to which is suitably secured a bearing 100 in which is journaled the rear end of a second propeller shaft 101 extending through and concentric with the shaft 97 and to the rearwardly extending end of which is rigidly secured a second propeller 102 adapted to exert a forward drive thrust when rotated in a clockwise direction as viewed from the front. The propeller shaft 101 is secured at its forward end, such as by splines, with a extension end 103 provided with an exteriorly splined flange 104 engageable by internal splines carried on a clutch sleeve 105 slidable axially thereof and in continuous running engagement therewith. The splined sleeve 105 is shown engaged with splines 106 carried on the hub of a bevel gear 107 which is journaled in a suitable bearing 108 and is in driven mesh with a co-operating gear 109 fastened on the end of the shaft 78. The clutch sleeve 105 is alternately engageable with spline teeth 106' carried on the hub of a driven bevel gear 107' which is suitably journaled in a bearing 108'. The head 103 of the propeller shaft 101, and the hollow shaft 97, are suitably journaled in needle bearings such as 110—111 disposed within the driven gears such as 107—107' and 92—92'.

The clutch sleeves 95 and 105 are in running engagement with yoke ends 112—113 provided on the upper ends of bell crank levers 114 and 115 whose opposite forked ends are in operative engagement with an actuating member 116 provided with a yoke portion surrounding the hubs of gears 92' and 107' and connected to a rod 117 extending upwardly through the casing 83 and secured at its upper end to suitable manually operable control means (not shown).

With the parts as shown in FIG. 6, the shaft 97 and attached propeller 98 rotate in a clockwise direction (broken arrow) as viewed from the front, to thereby exert a reverse drive thrust; and correspondingly the shafts 101 and the attached propeller 102 rotate in a counterclockwise direction (broken arrow) to likewise exert a reverse drive thrust. When it is desired to exert a forward drive thrust the clutch rod 117 is moved downwardly to thereby move the clutch sleeves 95 and 105 toward each other, thereby disengaging the gears 92 and 107 and engaging the oppositely disposed gears 92' and 107'. When it is desired to position the clutch in neutral position the sleeves 95 and 105 are moved to the intermediate position where they engage only the splines 96 on the shaft 97 and the splines 104 on the shaft end 103.

SINGLE SHAFT DRIVE MODIFICATION

Instead of having dual power output shafts such as 77 and 78, above described, a single power output shaft may be employed, where desirable. Referring to FIG. 7: Crankshafts 120 and 121 (corresponding to the crankshafts 59 and 60 above described) have their lower journal ends secured to gears 122 and 123 respectively. Said gears are in driving mesh with an internal gear 124 carried on the end of and preferably integral with an output power shaft 125 which is journaled at its inner end in bearing 126.

MODIFIED OUT OF PHASE VALVE TIMING MEANS

In the embodiment shown in FIG. 8, the engine is substantially the same as that described with reference to FIGS. 1–5, except that in this modification the cylinder bores in each of the U-cylinders A', B', C' and D' have their center line axes diverging from each other outwardly from their point of intersection Y (FIG. 14). This angle is designated as $\beta$ and the centers of rotation of the knuckle pins are disposed on these diverging center lines of the cylinders instead of being offset a distance such as O—S as described in connection with the previous embodiment where the cylinder axes of each pair were parallel. The angle $\beta$ (FIGS. 8 and 14) defines the spacing between the centers of rotation of the knuckle pins and may be designated the out of phase angle which is selected to give a desirable exhaust port opening lead compared to intake port timing. Additional exhaust port timing control is obtained by selecting exhaust port height greater than intake port height, and if desirable the center of rotation of the knuckle pins may be offset as in the previous embodiment for additional control. The proper combination of angle $\beta$ and exhaust and intake port height can thus provide an optimum series of exhaust and intake valve timing events.

In the embodiment shown in FIG. 3 the desired out of phase timing is provided by offsetting the centers of rotation of the knuckle pins as above pointed out and the desired out of phase angle (comparable to $\beta$) will be designated $\alpha$ and may be determined in the manner now to be pointed out with reference to FIG. 13. Assume pistons 39 and 40 of each U-type cylinder block to be positioned in their respetcive cylinder bores at the same level where the inlet pistons 39 has just commenced to open the inlet port 41; then pass reference axes through the axes of piston pins 139 and 140 respectively so that the axes will intersect at X to form the angle $\alpha$ therebetween equal to the desired out of phase angle. The centers of rotation C.R. of the knuckle pins such as 56 are located on these reference axes and therefore will be offset a distance O—S from the center lines of the cylinder bores, which in this instance are parallel. It will thus be seen that when the cylinder bore center lines are parallel by offsetting the centers of rotation of the knuckle pins comparable results of out of phase timing may be achieved similar to those where the cylinders are set at an angle to each other as in FIGS. 3 and 14.

As heretofore pointed out, one of the salient features of my invention is the orientation of all of the U-type cylinder bores in substantial coplanar peripheral alignment in order to produce the minimum engine dimension in an axial direction. This means that the cylinder bores in each U-type cylinder block must have a minimum center line separation slightly more than the cylinder bore diameter. Since, for valve timing purposes, the out of phase angle such as $\alpha$ or $\beta$ is usually less than 15°, in order to keep the engine diameter as small as possible one or both of the reference axes defining the out of phase angle such as $\alpha$ or $\beta$ should pass outside the axis of symmetry (such as A.S., FIGS. 13 and 14) so that the intersection such as X or Y of said reference axes with each other lies outside the axis of symmetry in a direction and at a distance therefrom such that the resulting engine configuration is smaller than it would be if these axes all intersected in the axis of symmetry. In the embodiments shown in FIGS. 3 and 13 and 8 and 14, intersection such as X or Y lies on the far side of the axis of symmetry A.S. relative to the cylinder block; whereas in the embodiment of FIG. 9 the intersection takes place on the near side of the axis of symmetry relative to the cylinder block.

The preferred way to comply with all these requirements is to employ a true motion frame carried on one or more crankshafts plus proper positioning of the various knuckle pin centers of rotation to achieve the desired phasing of piston motions as above set forth.

The complete cycle of fuel intake, compression, firing and scavenging will best be understood by reference to FIG. 8 showing the relative position of the pistons; and the same order will hold true with respect to the embodiment of the engine shown in FIGS. 1–5.

Referring to FIG. 8: In cylinder A', the scavenging and charging is being completed; in cylinder B', the "blow-down" has just been completed and the intake has commenced; firing has just taken place in cylinder C' and cylinder D' is on its compression stroke.

The timing diagram shown in FIG. 12 will serve to illustrate the flexibility of timing possible with my invention. The inlet is timed to open at an angle of 125° to the top center and to close at an angle of 245° from the top center, as represented by the angles T—O—I and T—O—IC, respectively. By utilizing merely the out of phase relationship of the pistons such as 39 and 40, either by the angle α (FIG. 13) resulting from the offsets O—S (FIG. 3) or by the angle β resulting from the angular setting of the cylinder bores (FIGS. 8 and 9), the exhaust valve may be made to open at the position represented by the dotted line OE' so that the exhaust would open at say a 115° angle from the top center and would close in the position illustrated by the dotted line OEC', say at an angle T—O—EC' of 235° from top center. This out of phase timing would result from an out of phase angle α or β of 10°. This timing is shown as being supplemented by the spacing of the exhaust valve port opening above the intake port opening a distance equivalent to any desired angle, say 5°, which would cause the exhaust valve to open as indicated by the solid line OE so that the angle T—O—E with the top center would be 110° and correspondingly the exhaust would then close as indicated by the solid line OEC so that the exhaust valve would close at 240° from the top center, or 5° before the inlet closes. It will thus be seen that by suitable selection of out of phase piston relationship and valve port height positions any desired predetermined timing arrangement may be readily effected. For example, by selecting a suitable relationship of exhaust port opening and inlet port opening the angles T—O—E' and EC—O—EC' could be increased to cause the exhaust to close at the same time or after the inlet closes.

In FIG. 9, there is shown a variation of this modification in which the cylinder bores of each pair of cylinder units such as A₂ and D₂ are inclined in such manner that their axes converge outwardly. This arrangement provides equal facilities for valve timing and may have advantages in certain applications.

In FIG. 10 an embodiment is shown which is identical with the embodiment of FIG. 9, except that instead of the connecting rods being in absolute alignment in the same plane they are disposed in staggered side by side relationship. For example, the connecting rods such as 127 and 128 are disposed in side by side relationship (FIG. 11) and are fastened by a common knuckle pin 129 to a true motion frame such as 130. In this arrangement the center lines of the pistons are slightly offset from absolute alignment in a plane passing at right angles to the symmetrical axis of the motor, but the cylinders are still in general coplanar alignment, which for practical purposes may be defined as meaning that the center lines of the cylinders are not offset from each other with respect to said plane more than one-half cylinder diameter and preferably only a sufficient amount to allow the connecting rods to be disposed side by side as indicated in FIG. 11.

Other advantages present or possible in engines embodying features of my invention are set forth below.

The engine is excellently adaptable to supercharging because of the selective unsymmetrical valve timing and because of the symmetrical arrangement of cylinders; and is also excellently adaptable to turbo supercharging for the same reasons.

Because of the selective control of exhaust and inlet valve timing which is possible, it is probable that in its simple form the engine can be made to aspirate itself without the use of a blower. This would be of particular interest for outboard marine application. There is ample space for a close coupled exhaust receiver for each U-type cylinder thus facilitating effective use of kinetic scavenging and charging in a blowerless embodiment.

Because of its unique features an engine made in accordance with this invention has many applications. It is suitable for either Otto cycle or diesel cycle designs. It can be designed for either upright operation (cylinders in vertical plane) or horizontal operation (cylinders in horizontal plane). It can either be air cooled or liquid cooled. It exploits all the advantages of the two cycle engine, and represents what is believed to be the best ratio of displacement to engine volume of any piston engine configuration.

Instead of one piece crankshafts, which require split bearings such as shown in FIG. 3, the crankshafts may be made in two pieces, having a crankpin mating joint of the face spline type accurately ground for driving fit and alignment—preferably such as is sold by Gleason Company under the trade name "Curvic." This will permit the use of a solid true motion frame such as shown in FIG. 8. It is further noted that in FIG. 8 the cylinder head and cylinder block joint surfaces are simple cylindrically turned surface segments.

It should be noted in reference to the engine configuration employing two single throw crankshafts that although the true motion frame nominally compels in-phase rotation of the crankshafts, there are two positions of momentary geometric instability which occur when the crankthrows and the crankshaft axes are all in plane. At most operating speeds this is of no practical significance because the flywheel effect of the crankshaft masses will maintain stability. At very low speeds such as starting or idle speeds it will be desirable to have the crankshafts additionally operably connected for in-phase rotation by some means such as gears or auxiliary properly phased crankthrows and links. In the figures shown herein this objective is served by the supercharger drive gear train or by the output gearing shown by FIG. 7. In configurations employing more than two single throw crankshafts there are no positions of instability.

Having thus described my invention with particularity with reference to the preferred embodiment of the same, and having referred to some of the possible modifications thereof, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. In a two stroke cycle interval combustion engine the combination of a plurality of U-type cylinders symmetrically disposed about a common axis and each having a common combustion chamber and a pair of cylinder bores, one of said cylinder bores in each U-type cylinder being provided with an inlet port and the other of said cylinders with an exhaust port, pistons disposed in said cylinder bores and controlling said ports, at least two crankshafts disposed in side by side relation with their center lines parallel to said axis of symmetry, and a true motion frame carried by the crankpin journals of said crankshafts, a plurality of pairs of similar connecting rods having their outer ends operably connected to said pistons respectively and their inner ends pivotally attached to said frame at selected points, the points of pivotal attachment of the inner end of each said connecting rod of each said pair being spaced apart from the other connecting rod of said pair, one of said points for each U-type cylinder being eccentric to each crankpin axis, said pivotal points of attachment of said inner ends being so positioned on said frame as to provide a selected out-of-phase motion between the pistons of each pair of said U-type cylinders.

2. In a two stroke cycle internal combustion engine the combination of a plurality of U-type cylinders symmetrically disposed about a common axis and each having a common combustion chamber and a pair of cylinder bores, one of said cylinder bores in each U-type cylinder being provided with an inlet port and the other of said cylinders with an exhaust port, pairs of pistons disposed in said pairs of cylinder bores and controlling said ports, at least two crankshafts disposed in side by side relation with their center lines parallel to said axis of symmetry, a true motion frame operably connected to said pistons and carried by the crankpin journals of said crankshafts to thereby cause said crankshafts to rotate in phase, said operable connection of the pairs of pistons of each U-type cylinder including a pair of connecting rods whose inner ends are pivotally connected to said true motion frame with the pivotal axis of one connecting rod of each pair spaced apart from the pivotal axis of the other connecting rod of said pair and means including said spaced apart axes to cause out of phase opening and closing of said intake and exhaust ports.

3. In a two stroke cycle internal combustion engine the combination of a plurality of U-type cylinders symmetrically disposed about a common axis and each having a common combustion chamber and a pair of cylinder bores, one of said cylinder bores in each U-type cylinder being provided with an inlet port and the other of said cylinders with an exhaust port, pistons disposed in said cylinder bores and controlling said ports, at least two crankshafts which are disposed in side by side relation with their center lines parallel to said axis of symmetry, and means operably connecting said pistons to said crankshafts for in phase rotation of said crankshafts and means for moving one of the pistons of each said U-cylinder out of phase with the other pistons of each said U-cylinder, said out of phase movement of said pistons causing said exhaust ports to open before said inlet ports by a predetermined crank angle lead and to close at a predetermined crank angle relative to said inlet ports.

4. In a two stroke cycle internal combustion engine the combination of a plurality of U-type cylinders symmetrically disposed about a common axis and each having a common combustion chamber and a pair of cylinder bores, one of said cylinder bores in each U-type cylinder being provided with an inlet port and the other of said cylinders with an exhaust port, pistons disposed in said cylinder bores and controlling said ports, at least two crankshafts which are disposed in side by side relation with their center lines parallel to said axis of symmetry, and means operably connecting said pistons to said crankshafts for in phase rotation of said crankshafts and means for moving one of the pistons of each said U-cylinder out of phase with the other pistons of each said U-cylinder, the outer extremities of the inlet and exhaust ports being disposed at different distances from the said axis of symmetry and jointly with said out of phase movement of said pistons causing said exhaust ports to open before said inlet ports by any desired predetermined crank angle lead and to close at any desired predetermined crank angle relative to said inlet ports.

5. An engine as set forth in claim 1 in which all of the points of pivotal attachment between the inner ends of said connecting rods and said frame being eccentric to said crankpin axes.

6. An engine as set forth in claim 1 in which the cylinder bores of each U-type cylinder are disposed at a predetermined angle one to the other and in cooperation with said selected points of pivotal attachment of said inner connecting rod ends to said frame providing said out-of-phase piston motion.

7. An engine as set forth in claim 1 in which angularly adjustable eccentric bushings are carried in said true motion frame and said crankshafts are journaled in said bushings.

8. In a two stroke cycle internal combustion engine a plurality of U-type cylinders radially and symmetrically disposed about a common axis and each having a pair of cylinder bores, the cylinder bores of the U-type cylinders disposed in general coplanar alignment with reference to a plane at right angles to the axis of symmetry, a common combustion chamber for each pair of U-type cylinder bores, pistons in said cylinder bores operably connected to a plurality of side by side crankshafts whose axes are parallel to the axis of symmetry, means for causing the crankshafts to rotate in phase, and means for causing the pistons of each cylinder pair to operate out of phase with respect to each other, piston controlled exhaust ports in one cylinder of each pair, piston controlled inlet ports in the other cylinder of each pair, said exhaust ported cylinder and inlet ported cylinder of each pair being disposed in relation to crankshaft rotation so that the out of phase motion of the pistons of each pair causes the exhaust ports to open before the inlet ports of the pair are opened by a predetermined exhaust opening lead as measured in crank angle degrees, and further causes the exhaust ports to close at any desired predetermined crank angle relative to said inlet ports.

9. A marine engine comprising a plurality of radially disposed power cylinders, pistons in said cylinders respectively, said pistons operatively connected to a pair of common output drive shafts, said drive shafts extending downwardly and connected at their lower ends to concentric propeller shafts extending laterally in the same direction and rotatable in respectively opposite directions each to the other, and a pair of propellers arranged in tandem and secured to said propeller shafts respectively, one of said propellers having a right hand pitch and the other a left hand pitch.

10. A marine engine as set forth in claim 9 in which the output drive shafts rotate in the same direction, and clutch means are provided for reversing the direction of rotation of both propellers.

11. A marine engine as set forth in claim 10 in which one of said propeller shafts is hollow and is secured to an inboard of said propellers and the other of said propeller shafts extends through said hollow shaft and said inboard propeller and carries an outboard propeller secured to its outer end.

12. In a two stroke cycle internal combustion engine adapted for marine use the combination of a plurality of U-type cylinders symmetrically disposed about a common axis and each having a common combustion chamber and a pair of cylinder bores, one of said cylinder bores in each U-type cylinder being provided with an inlet port and the other of said cylinders with an exhaust port, pistons disposed in said cylinder bores and controlling said ports, at least two crankshafts disposed in side by side relation with their center lines parallel to said axis of symmetry, a true motion frame operably connected to said pistons and carried by the crankpin journals of said crankshafts, a pair of output drive shafts operatively connected at one end to said crankshafts respectively and extending in a direction substantially parallel to said axis of symmetry, a pair of concentric propeller shafts extending in the same direction transverse to said axis and operatively connected to said drive shafts for rotation in respectively opposite directions each to the other, and a pair of propellers arranged in tandem and secured to said propeller shafts respectively, one of said propellers having a right hand pitch and the other a left hand pitch.

13. In a two stroke cycle internal combustion engine the combination of a plurality of U-type cylinder blocks generally radially and symmetrically disposed about a common axis of symmetry and each having a pair of cylinder bores, the cylinder bores of each U-type cylinder block being disposed in general coplanar alignment with reference to a plane perpendicular to the axis of symmetry, each cylinder block having a common combustion chamber for its pair of cylinder bores, pistons in said cylinder bores, piston controlled exhaust ports in one cylinder bore of each U-type pair, piston controlled inlet ports in the other cylinder bore of each U-type pair, connecting rods pivotally attached at one end to said pistons respectively, a crankshaft whose axis is parallel to the axis of symmetry, a nominally true motion frame operably attached to the crankpin of said crankshaft, means for causing the true motion frame to travel in an orbit whose radius is equal to the throw of said crankshaft, means for preventing substantial rotation of said true motion frame during its orbital travel, means for operably attaching the other end of said connecting rods to the true motion frame so that the frame end of each connecting rod travels in a substantially circular orbit whose radius is equal to the crank throw, the center of rotation of said connecting rod frame end being so positioned relative to its associated cylinder bore that a line passing through it and through the pivotal axis of its attachment to the associated piston in one bore of the U-type cylinder block forms an out of phase angle with a corresponding line defined by the corresponding parts associated with the other bore of the U-type cylinder block, said angle nominally defining the effective out of phase relationship between the piston motions of the two pistons of a U-type pair of cylinders due to positioning of the centers of rotation of the frame ends of the connecting rods of the U-type pair of cylinders when measured with each piston of a U-type pair separately placed in the position relative to its stroke as that occupied by the inlet piston at the instant of inlet port opening, said centers of rotation of the frame end of the connecting rods being further positioned such that at least one line defining said angle as described does not pass through the axis of symmetry, and such that the intersection of the two lines defining said angle as described lies outside the axis of symmetry in a direction and at a distance therefrom such that the resulting engine configuration is smaller than it would be if said angle defining lines intersected at the axis of symmetry.

14. In a two stroke cycle internal combustion engine the combination of a plurality of U-type cylinder blocks generally radially and symmetrically disposed about a common axis of symmetry and each having a pair of cylinder bores, the cylinder bores of each U-type cylinder block being disposed in general coplanar alignment with reference to a plane perpendicular to the axis of symmetry, each cylinder block having a common combustion chamber for its pair of cylinder bores, pistons in said cylinder bores, piston controlled exhaust ports in one cylinder bore of each U-type pair, piston controlled inlet ports in the other cylinder bore of each U-type pair, a piston pin journaled in each piston, a connecting rod pivotally connected to each piston pin, a crankshaft whose axis is parallel to the axis of symmetry, a nominally true motion frame operably attached to the crankpin of said crankshaft, means for causing the true motion frame to travel in an orbit whose radius is equal to the throw of said crankshaft, means for preventing substantial rotation of said true motion frame during its orbital travel, means for operably attaching the other end of said connecting rods to the true motion frame so that the frame end of each connecting rod travels in a substantially circular orbit whose radius is equal to the crank throw, the center of rotation of said connecting rod frame end being so positioned relative to its associated cylinder bore that a line passing through it and through the axis of the associated piston pin in one bore of the U-type cylinder block forms an out of phase angle with a corresponding line defined by the corresponding parts associated with the other bore of the U-type cylinder block, said angle nominally defining the effective out of phase relationship between the piston motions of the two pistons of a U-type pair of cylinders due to positioning of the centers of rotation of the frame ends of the connecting rods of the U-type pair of cylinders when measured with each piston of a U-type pair separately placed in the position relative to its stroke as that occupied by the inlet piston at the instant of inlet port opening, said centers of rotation of the frame end of the connecting rods being further positioned such that at least one line defining said angle as described does not pass through the axis of symmetry, and such that the intersection of the two lines defining said angle as described lies outside the axis of symmetry in a direction and at a distance therefrom such that the resulting engine configuration is smaller than it would be if said angle defining lines intersected at the axis of symmetry.

15. In a two stroke cycle internal combustion engine the combination of a plurality of U-type cylinder blocks generally radially and symmetrically disposed about a common axis of symmetry and each having a pair of cylinder bores, the center lines of the cylinder bores of each U-type cylinder block being disposed substantially in a common plane perpendicular to the axis of symmetry, each cylinder block having a common combustion chamber for its pair of cylinder bores, pistons in said cylinder bores, piston controlled exhaust ports in one cylinder bore of each U-type pair, piston controlled inlet ports in the other cylinder bore of each U-type pair, a piston pin journaled in each piston, a connecting rod pivotally connected to each piston pin, a pair of nominally in-phase rotating crankshafts of equal throw whose axes are parallel to the axis of symmetry, a nominally true motion frame operably attached to the crankpins of said crankshafts and supported by the crankshaft journals causing the true motion frame to travel in an orbit whose radius is equal to the throw of said crankshafts while preventing substantial rotation of said frame, means for operably attaching the other end of said connecting rods to the true motion frame so that the frame end of each connecting rod travels in a substantially circular orbit whose radius is equal to the crank throw, the center of rotation of said connecting rod frame end being so positioned relative to its associated cylinder bore that a line passing through it and through the axis of the associated piston pin in one bore of the U-type cylinder block forms an out of phase angle with a corresponding line defined by the corresponding parts associated with the other bore of the U-type cylinder block, said angle nominally defining the effective out of phase relationship between the piston motions of the two pistons of a U-type pair of cylinders due to positioning of the centers of rotation of the frame ends of the connecting rods of the U-type pair of cylinders when measured with each piston of a U-type pair separately placed in the position relative to its stroke as that occupied by the inlet piston at the instant of inlet port opening, said centers of rotation of the frame end of the connecting rods being further positioned such that at least one line defining said angle as described does not pass through the axis of symmetry, and such that the intersection of the two lines defining said angle as described lies outside the axis of symmetry in a direction and at a distance therefrom such that the resulting engine configuration is smaller than it would be if said angle defining lines intersected at the axis of symmetry.

16. An engine as claimed in claim 14 in which neither of the lines defining said out of phase angle pass through the center of symmetry.

References Cited in the file of this patent

UNITED STATES PATENTS

| 1,358,954 | Holmstrom | Nov. 16, 1920 |
| 1,557,875 | Preston | Oct. 20, 1925 |
| 2,159,209 | Hazen | May 23, 1939 |
| 2,234,918 | Linthwaite | Mar. 11, 1941 |

FOREIGN PATENTS

| 734,931 | Germany | May 3, 1943 |

UNITED STATES PATENT OFFICE
CERTIFICATE OF CORRECTION

Patent No. 2,989,022 June 20, 1961

Wilton G. Lundquist

It is hereby certified that error appears in the above numbered patent requiring correction and that the said Letters Patent should read as corrected below.

Column 5, line 26, for "emotion" read -- motion --; column 7, line 19, for "a" read -- an --; column 8, line 47, for "produce" read -- provide --; column 10, line 52, for "interval" read -- internal --.

Signed and sealed this 21st day of November 1961.

(SEAL)
Attest:

ERNEST W. SWIDER
Attesting Officer

DAVID L. LADD
Commissioner of Patents

USCOMM-DC